Aug. 8, 1950 W. E. McMURRAY 2,518,428
COMBINED SCRAPER AND EMPTIER MECHANISM
FOR WET PAN MIXING MACHINES
Filed June 14, 1947 2 Sheets-Sheet 1
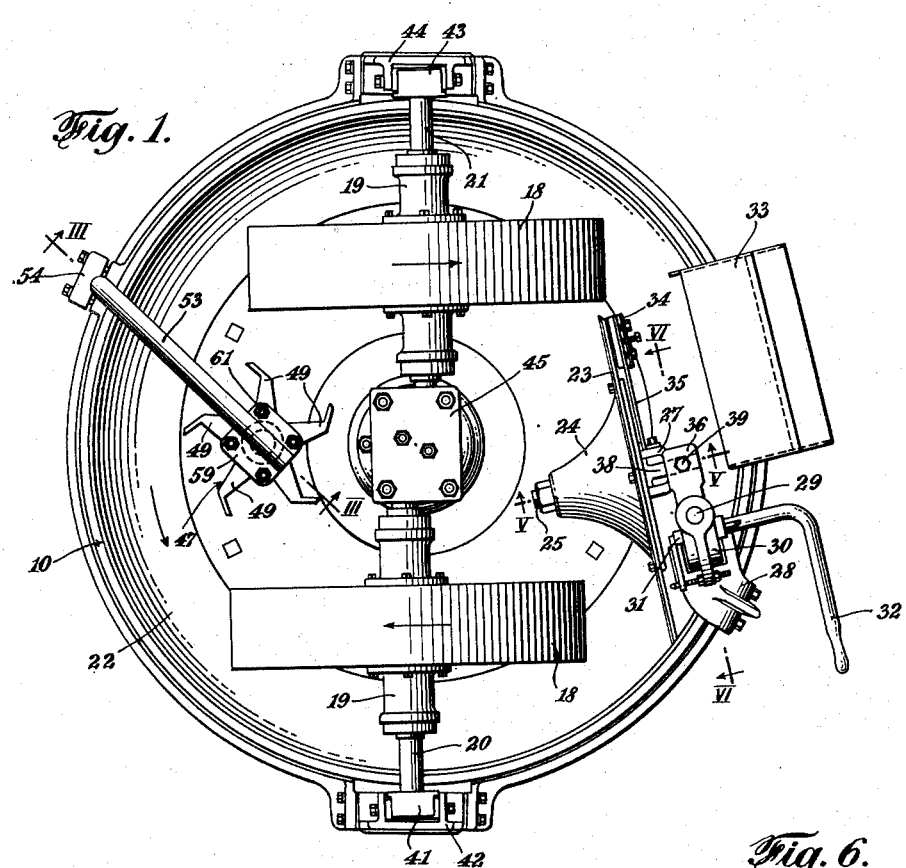
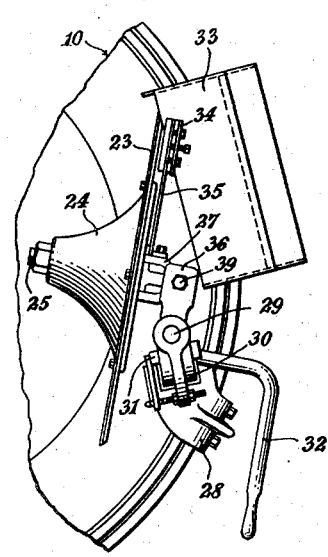
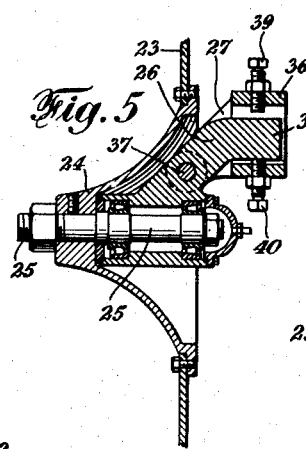
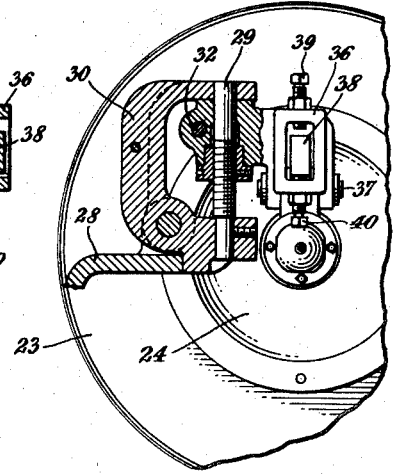

Aug. 8, 1950  W. E. McMURRAY  2,518,428
COMBINED SCRAPER AND EMPTIER MECHANISM
FOR WET PAN MIXING MACHINES
Filed June 14, 1947  2 Sheets-Sheet 2

INVENTOR
Walter E. McMurray
BY
Knight Bros
ATTORNEYS

Patented Aug. 8, 1950

2,518,428

UNITED STATES PATENT OFFICE 2,518,428

COMBINED SCRAPER AND EMPTIER MECHANISM FOR WET PAN MIXING MACHINES

Walter E. McMurray, Clearfield, Pa., assignor to Clearfield Machine Company, Clearfield, Pa., a corporation of Pennsylvania Application June 14, 1947, Serial No. 754,744

6 Claims. (Cl. 222—162)

1

This invention relates to a mixing machine and more particularly to a grinding and mixing machine of the type commonly known as a wet pan mixing machine.

In mixing machines of the named class, which have heretofore been used, some difficulty has been experienced in making the usual scraper and emptier disc conform to the inner surface of the pan in both its scraping and emptying positions. Difficulty has also been experienced because of foreign matter which has become wedged under the disc, resulting in bending and breaking of the apparatus. Furthermore with some materials, it has been found that the muller-rolls tend to spill material out of the pan. Finally, difficulty has been experienced in adjusting the usual agitator for continuing best operation.

I have now found that it is possible to overcome the difficulties experienced with the scraper and emptier disc by means of a novel pivot arrangement, whereby the disc may be caused to conform to the inner surface of the pan in both the scraping and the emptying positions, and whereby large or hard pieces of foreign matter may pass under the disc without being wedged beneath it. I have also found that by novel arrangement of the shafts upon which the muller-rolls rotate, spillage of material from the pan by action of the muller-rolls can be eliminated. Finally, I have found it possible so to adjust the agitator as to keep it in proper contact with the bottom of the pan as wear takes place. The novel features of the present invention provide a greatly improved mixing machine with advantages not present in known machines of like character.

The invention is shown by way of illustration in the accompanying drawings, in which Figure 1 is a plan view of a mixing machine constructed and arranged according to the invention.

Figure 4 is a fragmental plan view of the mixing machine illustrated in Figure 1, showing the scraper and emptier disc in the emptying position.

Figure 5 is a fragmental vertical section taken on the line V—V of Figure 1, and Figure 6 is a broken vertical section taken on the line VI—VI of Figure 1.

2

Figure 2:
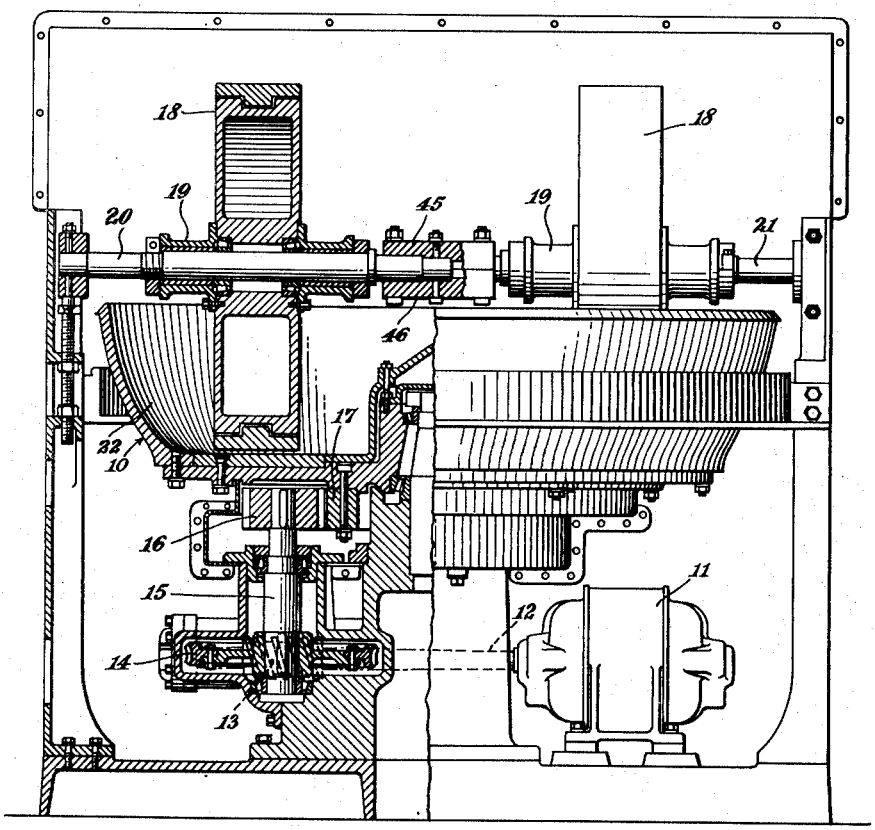
Figure 2 is an elevation of the same machine as viewed from the right in Figure 1, half of this figure being shown in vertical section, and some parts being omitted for clarity.

In the drawings, there is shown a mixing machine comprising a horizontal grinding and mixing pan 10, which is rotated about a vertical axis from a motor 11, the shaft 12 of which has a worm gear 13 thereon, through which a toothed wheel 14 is driven. The toothed wheel is fixed to a vertical shaft 15, having fixed to its upper end a spur gear 16, which meshes with a gear ring 17 bolted to the bottom of the pan 10, whereby the latter is rotated. Muller-rolls 18, 18 are mounted through hubs 19, 19 upon fixed shafts 20 and 21 (later to be described) in a position to mull or crush material in the bottom of the pan as the latter rotates.

The pan 10 has an upwardly-flared rim 22 which provides an inner surface of revolution around the rotary axis of the pan. When the pan is rotated, its contents tend to move outwardly to the rim 22, and if permitted to remain there, will not be subject to the action of the muller-rolls. Accordingly, a disc 23 is provided for scraping the material from the rim 22 and deflecting it inwardly of the pan toward the portion thereof upon which the muller-rolls act. The disc 23 is a combined scraper and emptier disc, as will later more fully appear. The scraping position of the disc 23 is illustrated in Figure 1. In this position the peripheral edge of the disc is in contact along a circular arc with the surface of revolution provided by the rim 22. As illustrated in Figure 1, the pan rotates in a contra-clockwise direction. The angle which the disc makes with the pan is such that material scraped from its rim is deflected to the bottom of the pan beneath the muller-roll 18, toward which the pan rotates in passing the disc.

It is preferred to employ a rotary disc for the scraping operation as well as for the emptying operation. Accordingly, the disc is journaled for rotation within the pan. As here shown, the disc 23 is bolted to a bell-shaped member 24 which is, in turn, fixed to a journal 25, extending axially therein. See Figure 5. The journal 25 is disposed in a substantially horizontal position, and is rotatable in a bearing member 26. The bearing member is carried by an angular support 27, which is, in turn, pivoted for horizontal movement to a stationary bracket 28 fixed outside of the pan 10 and extending thereover. Thus a vertical pin 29, transversely offset with respect to the journal 25, connects the angular support 27 to the stationary bracket. The angular support may, therefore, be swung horizontally about the pin 29 to vary the position of the disc 23 in the pan.

In the position illustrated in Figure 1, the material in the pan moving past the disc 23 and deflected along its lower surface, turns the disc, rotating it in a direction which causes its edge, as seen in Figure 1, to move downwardly of the drawing, and the journal 25 turns freely in the bearing member 26 to permit this turning of the disc. At the same time, the material in the pan is deflected from its circular path to move beneath the muller-roll beyond the disc.

If a large or hard bit of foreign matter becomes wedged beneath the disc 23, damage may result as the pan continues to rotate. The apparatus may be broken or bent. Provision is, therefore, made for permitting the disc 23 to ride up over such objects as they come in contact with the rotating disc. To this end, the angular support 27 is not pivoted directly to the bracket 28, but the pivot 29 connects the angular support 27 to a part 30, which is in turn pivoted to the stationary bracket 28 by a horizontal pin 31 which is parallel to the shaft 25. About this horizontal pin 31, the vertical pin 29, the angular support 27 and the entire disc assembly are free to move vertically.

When it is desired to empty the pan of its mulled and mixed contents, the disc 23 is swung from the scraping position illustrated in Figure 1 into the emptying position shown in Figure 4. In this position, the peripheral edge of the disc is in contact substantially along a second circular arc with the surface of revolution provided by the rim. A handle 32 is provided for swinging the disc. The handle 32 is connected to the angular support 27 above the stationary bracket and beneath the upper arm of part 30. Thus, by swinging the handle 32 in a clockwise direction, as viewed in Figure 1, the disc assembly may be similarly swung about the pivot 29 until it reaches emptying position, illustrated in Figure 4. As the pan rotates, the material therein is carried between the disc and the rim 22, where it is trapped between the disc and the revolving rim and its continued movement turns the disc, with the result that the material is carried upwardly thereby over the top of the revolving rim and is emptied into a discharge chute 33 through which it leaves the machine. A scraper 34, carried by an arm 35 and bolted to the angular support 27, coacts with the disc 23 to prevent material from being carried any appreciable distance above the discharge chute.

It will be observed that the angle between the disc 23 and the rim 22 is less when the disc is in the emptying position than it is when the disc is in the scraping position. This is necessarily so if the disc is to perform its separate functions effectively. Since the curve of the rim is designed to meet the circumference of the disc when in the scraping position, and since the curve of the rim remains constant, obviously some adjustment of the disc position is required if the circumference of the disc is to conform to the curve of the rim in the emptying position of the disc. In order that such adjustment may be made, means is provided for permitting the disc to tilt out of the vertical plane until its edge fits the curve of the rim, and means is also provided for limiting this tilting action. The angular support 27 is, accordingly, formed as a transverse yoke 36 adjacent the point at which it carries the bearing member 26 and the bearing member is horizontally pivoted to the angular support as by a pin 37. Thus, a horizontal pivot, extending transversely of the shaft 25, is provided between the bearing member 26 and the vertical pivot, or pin 29, about which the disc may rock to adjust its peripheral edge to the rim surface. Furthermore the bearing member 26 has a tongue 38 which extends from the pin 37 within the yoke 36 formed on the angular support 27. See Figure 5. Set screws 39 and 40, extending through the yoke above and beneath the tongue, limit rocking of the bearing member about the pin 37. Thus, the disc 23 may adjust itself to the curve of the rim when in emptying position.

The different angles which the disc makes with the rim in the scraping and emptying positions, are necessary for securing effective scraping and effective discharge of material from the pan, and it will be observed that the difference between these angles is effected by the position of the vertical pin 29 about which the disc 23 swings between the position of scraping and the position of discharging. If the shaft 25 were disposed radially of the pan and the vertical pin were in line with this axis about which the disc rotates, these angles would be the same. However, by displacing the pin 29 toward the line of rim contact with the disc during the scraping operation, the scraping angle is made greater and the emptying angle is made smaller.

It has been found that the muller-rolls have a tendency to discharge material over the rim of the pan because material at the outer edge of the roll sometimes assumes and maintains a curved shape conforming to the circular edge of the roll. Such material carried upwardly by the rising face of the roll may be discharged over the pan rim, in much the same way in which the disc 23 operates when in emptying position. By having the upwardly-turning roll edge farther from the rim than the downwardly-turning roll edge, it has been found possible to prevent such discharge of material from the pan. Special means is, therefore, provided for positioning the upwardly-turning muller-roll edge at a greater distance from the rim than the corresponding downwardly-turning edge. It is for this purpose that the muller-rolls are mounted upon separate parallel fixed shafts 20 and 21, on opposite sides of the pan diameter instead of being mounted as heretofore on a single continuous fixed shaft extending between stationary uprights immediately outside of and diametrically across the pan. Thus, the shaft 20 is fixed at its outer end in a block 41 carried by a stationary upright 42, and the outer end of the separate shaft 21 is fixed in a block 43 carried by a diametrically opposite stationary upright 44 outside of the pan. The inner ends of the shafts 20 and 21 are eccentrically clamped between members 45 and 46 (Figures 1 and 2) above the center of the pan. The inner end of each shaft is so clamped as to bring the upwardly-turning muller-roll edge farther from the rim 22 than the downwardly-turning edge. As a result, material carried upwardly by the muller-rolls will fall within the pan instead of being spilled over its edge.

A rotary agitator 47 is positioned in the pan for action in well-known manner to break up, agitate and mix material which has been pressed into cakes by the muller-rolls. In the present embodiment, the agitator is disposed between the two muller-rolls 18, 18 and substantially opposite the combined scraper and emptier disc 23. The agitator 47 comprises a head formed by a plate 48 and feet 49 which extend outwardly and downwardly therefrom. The agitator 47 is fixedly attached to the bottom of a rotary hub 50 which, in operating position, extends upwardly therefrom to a position within a fixed flanged bushing 51, which surrounds the upper end of the hub. A stationary shaft 52 is made fast and fixedly secured in known or convenient manner within the stationary bushing 51, and extends downwardly therefrom within the hub 50 which rotates thereon. Thus, the agitator rotates about the shaft 52.

Figure 3:
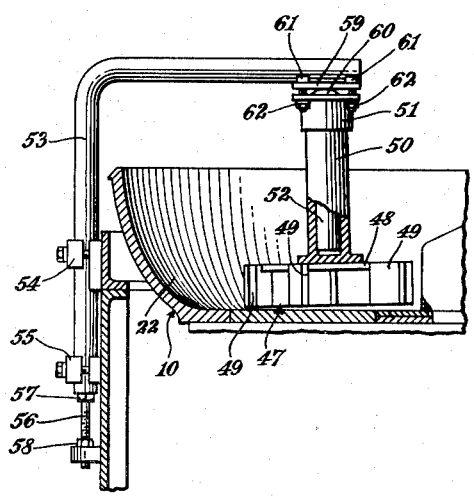
Figure 3 is a broken section taken on the line III—III of Figure 1.

For best operation, the feet 49 must be in contact with the bottom of the pan near the rim 22, but must clear the bottom on the opposite side of the mixer. The shaft 52 must, therefore, incline downwardly away from the rim. See Figure 3.

As the bottoms of the feet 49 wear, it becomes necessary to adjust the position of the shaft 52 vertically. Such adjustment is effected by supporting the fixed flanged bushing 51 on a vertically adjustable support above the pan 10. As here shown, this support is a goose-neck 53 fastened as by clamps 54 and 55 to the stationary frame within which the pan is disposed. The goose-neck may be raised or lowered by loosening the clamps 54 and 55, loosening the nut 58, and turning the adjusting screw 56. Tightening the nut and the clamps fixes the assembly in position.

With continued operation of the mixer the bottom of the pan will wear and become concave. This requires adjustment of the inclination of the agitator and hence means for adjusting the inclination of the stationary shaft 52. Novel means is provided for making this adjustment. Accordingly, a plate 59 is welded or otherwise fixed horizontally beneath the upper and outer end of the goose-neck 53, and a plurality of holes are made in this plate to register with similar holes formed in the flange of the bushing 51. Four such holes are illustrated in the drawings. The upper end of the stationary shaft 52 is given a spherical form 60 and the shaft is so fixed in the bushing 51 that its upper end projects beyond the flange formed thereon. Bolts 61 are passed through the registering holes in the plate 59 and the flange of the bushing 51, and nuts 62, threaded upon the bolts draw the plate and bushing together with the spherical end 60 of the stationary shaft 52 in contact with the plate 59. Loosening and tightening the nuts 62 upon the bolts 61 adjusts the inclination of the rotary hub 50 and stationary shaft 52. The holes formed in the plate 59 and in the flange on the bushing 51, together with the bolts 61 and nuts 62, constitute a connection between the plate and the shaft 52 for tilting the shaft angularly about its spherical upper end 60 and fixing the angle of the shaft with respect to the plate 59. Obviously other connections might effect the same result and adjust the inclination of the agitator 47 in the pan.

As the inclination of the shaft 52 to the vertical is increased, the agitator may come into contact with the central portion of the pan 10. To avoid this, it is merely necessary to loosen the clamps 54 and 55 and to swing the goose-neck in a horizontal plane. Thus, a third adjustment may be effected.

From the foregoing it will be apparent that the invention provides a novel pivot arrangement whereby a combined scraper and emptier disc may be caused to conform to the inner surface of a grinding and mixing pan in both of its operating positions. It will also be apparent that the invention makes it possible for large or hard pieces of foreign matter to pass beneath the disc without damage to the mixer parts. Furthermore the invention prevents spilling of material from the mixer by the muller-rolls. Finally, the agitator may be appropriately and easily adjusted as required.

The details of the invention herein described and illustrated in the drawings are presented merely as examples of how the invention may be applied. Other forms and embodiments of the invention coming within the proper scope of the appended claims will readily suggest themselves to those skilled in the mixing machine art.

I claim:

1. A mixing machine comprising a horizontal rotary pan having an upwardly-flared rim providing an inner surface of revolution around the rotary axis of said pan, a combined scraper and emptier disc, and a substantially horizontal bearing immediately above said pin in which said disc is journaled for rotation with its peripheral edge in contact along a circular arc with the surface of revolution provided by the rim of said pan, in combination with a stationary support for said substantially horizontal bearing, having a freely pivotal supporting connection therewith through a vertical pivot horizontally offset from the axis of said substantially horizontal bearing to permit said scraper and emptier disc and its bearing to swing horizontally about said vertical pivot and bring the peripheral edge of said disc into contact substantially along a second circular arc with the surface of revolution provided by the rim of said pan.

2. A mixing machine comprising a horizontal rotary pan having an upwardly-flared rim providing an inner surface of revolution around the rotary axis of said pan, a combined scraper and emptier disc, a substantially horizontal bearing immediately above said pan in which said disc is journaled for rotation with its peripheral edge in contact along a circular arc with the surface of revolution provided by the rim of said pan, in combination with a stationary support for said substantially horizontal bearing, having a freely pivotal supporting connection therewith through a vertical pivot horizontally offset from the axis of said substantially horizontal bearing to permit said scraper and emptier disc and its bearing to swing horizontally about said vertical pivot and bring the peripheral edge of said disc into contact substantially along a second circular arc with the surface of revolution provided by the rim of said pan, and a horizontal pivot extending transversely of said bearing and between said bearing and said vertical pivot about which said disc may turn to adjust its peripheral edge to the surface of revolution formed by the rim of said pan.

3. A mixing machine comprising a horizontal rotary pan having an upwardly-flared rim providing an inner surface of revolution around the rotary axis of said pan, a combined scraper and emptier disc, a substantially horizontal bearing immediately above said pan in which said disc is journaled for rotation with its peripheral edge in contact along a circular arc with the surface of revolution provided by the rim of said pan, in combination with a stationary support for said substantially horizontal bearing, having a freely pivotal supporting connection therewith through a vertical pivot horizontally offset from the axis of said substantially horizontal bearing to permit said scraper and emptier disc and its bearing to swing horizontally about said vertical pivot and bring the peripheral edge of said disc into contact substantially along a second circular arc with the surface of revolution provided by the rim of said pan, a horizontal pivot extending transversely of said bearing and between said bearing and said vertical pivot about which said disc may turn to adjust its peripheral edge to the surface of revolution formed by the rim of said pan, and set screws limiting turning of said disc about said horizontal pivot.

4. A mixing machine comprising a horizontal rotary pan having an upwardly-flared rim providing an inner surface of revolution around the rotary axis of said pan, a stationary bracket fixed outside of said pan and extending thereover, an angular support, a vertical pivot, means for connecting one part of said angular support through said pivot to said bracket over said pan, a substantially horizontal bearing carried by another part of said support inwardly of the rim of said pan, and a combined scraper and emptier disc journaled in said bearing for rotation with its peripheral edge in contact along a circular arc with the surface of revolution provided by the rim of said pan, said support being turnable horizontally about said vertical pivot to bring the peripheral edge of said disc into contact along substantially a second circular arc with the surface of revolution provided by the rim of said pan.

5. A mixing machine comprising a horizontal rotary pan having an upwardly-flared rim providing an inner surface of revolution around the rotary axis of said pan, a stationary bracket fixed outside of said pan and extending thereover, an angular support, a vertical pivot, means for connecting one part of said angular support through said pivot to said bracket over said pan, and a substantially horizontal bearing horizontally pivoted to another part of said support inwardly of the rim of said pan, said support having a transverse yoke formed thereon adjacent the point at which said bearing is horizontally pivoted and said bearing having a tongue formed thereon extending within the yoke formed on said support, in combination with a combined scraper and emptier disc journaled in said bearing for rotation with its peripheral edge in contact along a circular arc with the surface of revolution provided by the rim of said pan, said support being turnable horizontally about said vertical pivot to bring the peripheral edge of said disc into contact substantially along a second circular arc with the surface of revolution provided by the rim of said pan, and upper and lower set screws threaded through the yoke formed on said support for coacting with the tongue formed on said bearing to limit rocking of said horizontally pivoted disc.

6. A mixing machine comprising a horizontal rotary pan having an upwardly-flared rim providing an inner surface of revolution around the rotary axis of said pan, a stationary bracket fixed outside of said pan and extending thereover, an angular support, a vertical pivot, means for connecting one part of said angular support through said pivot to said bracket over said pan, a substantially horizontal bearing carried by another part of said support inwardly of the rim of said pan, a combined scraper and emptier disc journaled in said bearing for rotation with its peripheral edge in contact along a circular arc with the surface of revolution provided by the rim of said pan, said support being turnable horizontally about said vertical pivot to bring the peripheral edge of said disc into contact substantially along a second circular arc with the surface of revolution provided by the rim of said pan, and a horizontal pivot at right angles to said vertical pivot about which said support and said vertical pivot may rise against the force of gravity when a foreign object becomes wedged under said disc.

WALTER E. McMURRAY.

REFERENCES CITED

The following references are of record in the file of this patent:

UNITED STATES PATENTS

| Number | Name | Date |
|---|---|---|
| 278,407 | Cutler | May 29, 1883 |
| 432,602 | Clifford | July 22, 1890 |
| 538,697 | Penfield | May 7, 1895 |
| 834,387 | Little | Oct. 30, 1906 |
| 1,127,587 | Carlin | Feb. 9, 1915 |
| 1,181,990 | Carlin | May 9, 1916 |
| 1,718,004 | Reed | June 18, 1929 |
| 1,806,077 | McMurray | May 19, 1931 |
| 2,277,209 | Christensen | Mar. 24, 1942 |
| 2,304,326 | Adams | Dec. 8, 1942 |